(12) United States Patent
Fischer et al.

(10) Patent No.: US 6,687,507 B2
(45) Date of Patent: Feb. 3, 2004

(54) TIME OF ARRIVAL ESTIMATION FOR EDGE/GSM

(75) Inventors: Sven Fischer, Nürnberg (DE); Ari Kangas, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 409 days.

(21) Appl. No.: 09/835,404

(22) Filed: Apr. 17, 2001

(65) Prior Publication Data

US 2002/0004400 A1 Jan. 10, 2002

Related U.S. Application Data

(60) Provisional application No. 60/201,427, filed on May 3, 2000.

(51) Int. Cl.$^7$ .................................................. H04Q 7/20
(52) U.S. Cl. ................. 455/456.6; 455/425; 455/456.1; 455/334; 342/450; 375/142; 375/150; 375/349
(58) Field of Search .............................. 455/425, 456.1, 455/456.6, 334, 414.2; 342/450–457; 375/142, 150, 262, 343, 349

(56) References Cited

U.S. PATENT DOCUMENTS

| | | | |
|---|---|---|---|
| 6,009,334 A | | 12/1999 | Grubeck et al. |
| 6,385,254 B1 | * | 5/2002 | Piirainen et al. ............ 375/262 |
| 6,529,708 B1 | * | 3/2003 | Larsson et al. .......... 455/67.16 |
| 2002/0016172 A1 | * | 2/2002 | Kangras et al. ............. 455/456 |

FOREIGN PATENT DOCUMENTS

| | | |
|---|---|---|
| WO | 99/27738 | 6/1999 |
| WO | 99/39484 | 8/1999 |
| WO | 01-06275 | 1/2001 |

OTHER PUBLICATIONS

Fischer S. et al., "Time of arrival estimation of narrowband TDMA signals for mobile positioning", IEEE International Symposium on Personal, Indoor and Mobile Radio Communications, vol. 1, Sep. 8, 1998, pp. 451–455.

Callaghan T. G. et al., "Sampling and algorithms aid modulation recognition", Microwaves and RF, US, Penton Publishing, Hasbrouck Heights, NJ, vik, 24m ni, Sep. 9, 1985, pp. 117–119, 121.

* cited by examiner

Primary Examiner—William Trost
Assistant Examiner—James D Ewart (57) ABSTRACT

In systems which transmit both GSM modulated and EDGE modulated signals, time of arrival estimations can be improved without requiring the detection of the type of modulation used on the received signal. In accordance with the present invention, a received signal is initially demodulated by a receiver in accordance with a first demodulation scheme. The demodulated signal is split into two copies. Taking into account the initial demodulation, one of the copies is demodulated in accordance with another demodulation scheme, thereby resulting in a first signal demodulated in accordance with the first demodulation scheme and a second signal demodulated in accordance with a second demodulation scheme. A training sequence is used to correlate the two signals which are then summed in a incoherent integration process. The result of the incoherent integration is used to estimate the time of arrival of the received signal.

19 Claims, 11 Drawing Sheets

TIME OF ARRIVAL ESTIMATION FOR EDGE/GSM

This application claims priority under 35 U.S.C. §119(e) to U.S. Provisional application No. 60/201,427 filed on May 3, 2000, the entire disclosure of which is herein expressly incorporated by reference.

FIELD OF INVENTION

The present invention relates to the field of mobile radio telecommunications, and more particularly, to determining the location of mobile stations within the coverage area of a radio telecommunications network using time of arrival (TOA) estimations.

BACKGROUND

The problem of determining the location of a mobile station (MS) is of considerable interest. The primary application that is driving this activity is the positioning of E911 callers in the United States. The United States Federal Communications Commission has imposed a requirement wherein operators, by October 2001, must report the position of emergency callers within their service area. Also, the European Union has proposed a similar law for all 112 callers, which is to take affect by January 2003. In parallel, different vendors of mobile communication equipment have presented solutions to this problem to fulfil these legal requirements.

In GSM, four different position location methods have been standardized to enable operators to offer location-based services. Accordingly, in addition to providing the position of emergency callers, it is likely that mobile positioning will open the door into a new dimension of mobile services and applications that use the subscriber position as input. For example, the position of a subscriber can be used to provide the subscriber with information about restaurants in proximity to the subscriber.

The cellular positioning techniques available today can be divided into network based solutions and terminal based, e.g., mobile station based, solutions. A network-based solution standardized in GSM is the Uplink Time-of-Arrival (TOA) positioning method, which does not require changes to the mobile station. A mobile station based solution standardized in GSM is the Enhanced Observed Time Difference (E-OTD) method.

The core measurements performed by the mobile station to support the E-OTD location method are Time-of-Arrival (TOA) measurements. The mobile station listens to the broadcast control channel (BCCH) carrier of a certain cell and measures the TOA of bursts relative to its own time base. OTD values are formed by subtracting the TOA measurement of a neighbor cell from the TOA measurement of the serving cell. To obtain an accurate position of the mobile station, the TOA's must be estimated with a high accuracy. For example, a TOA error of 1 bit (i.e. 1 sampling point) corresponds to approximately 1100 meters range error in the position estimation.

For TOA estimation, the mobile station can use normal bursts, synchronization bursts, dummy bursts or a combination thereof. It is not necessary to synchronize to the neighbour base station in order to perform the TOA measurements. The TOA measurement strategy is similar to the neighbour cell measurements in GSM, i.e., where the mobile station is required to perform neighbour cell measurements (e.g. signal strength measurements) in order to find possible candidates for a handover. In principle, the TOA measurements and the neighbor cell signal strength measurements can be made in parallel. The mobile station can be provided with assistance data by the network, which allows predicting the TOA value together with an uncertainty. This defines a correlation search window within which the TOA is expected to be. Therefore, the mobile station knows when to measure the TOA for a particular signal and can schedule the TOA measurements for the individual links accordingly. For more information regarding correlation windows, the interested reader should refer to U.S. patent application Ser. No. 09/186,192 "Improvements In Downlink Observed Time Difference Measurements" by A. Kangas et al., which is herein expressly incorporated by reference.

The choice between synchronization bursts or normal bursts depends, e.g., on the requested response time and the mode of the mobile station. Although the synchronization bursts offer the best correlation properties, these bursts occur very infrequently, i.e., only once every 10 TDMA frames, whereas normal bursts are available at most 8 times per frame. To enable a quick measurement response from the mobile station in dedicated mode, e.g. during emergency calls, it may therefore be necessary to measure on normal bursts.

One problem for TOA estimation is that a mobile station must be able to hear a sufficient number of base stations. The signal strength from neighboring base stations may be very low, resulting in a low signal-to-noise ratio, typically −10 dB. Multipath propagation is also a problem. The multipath propagation channel sets the limit on the estimation accuracy. In co-pending U.S. patent application Ser. No. 09/354,175 "Efficient Determination of Time of Arrival of Radio Communication Signals" by E. Larsson et al., which is herein incorporated by reference in its entirety, a simple TOA estimation algorithm with very low complexity is described for estimating TOA at low signal-to-noise ratios. This algorithm is based on the Incoherent Integration (ICI) with Multipath Rejection (MPR) principle presented in International Patent Publication WO-9927738, which is also incorporated herein by reference in its entirety.

In accordance with the ICI principle described in the above-identified International Patent Publication, the received burst i is first correlated with the known training sequence, to obtain the correlation result $c_i(k)$; as indicated below in equation (1):

$$c_i(k) = \tilde{b}_i(k) * TS(k)_i \qquad (1)$$

where $\tilde{b}_i(k)$ is the received, de-rotated burst, $TS(k)$ is the known training sequence contained in the burst $\tilde{b}_i(k)$ and * is the correlation operator. This correlation is performed for a number of M received bursts. The absolute squares of the M correlation results $c_i(k)$ are summed, as shown in equation (2).

$$\psi(k) = \Sigma_{i=o}^{M-1} |c_i(k)|^2. \qquad (2)$$

The effect of this summation is that the noise in the correlation result is reduced and the maximum (i.e. the TOA) is more likely to be detected. Performing a weighted summation can increase the detection probability, per equation (3):

$$\psi(k) = \Sigma_{i=o}^{M-1} w_i |c_i(k)|^2, \qquad (3)$$

where the weights $w_i$ are based on the estimated SNR. Since the weights $w_i$ are difficult to estimate, an alternative ICI method based on the maximum likelihood criterion, also described in co-pending U.S. patent application Ser. No. 09/354,175, is presented in equation (4) below:

$$\psi_{log}(k)=\Sigma_{i=o}^{M-1}\log(E_sE_{bi}-|c_i(k)|^2), \qquad (4)$$

where $E_S$ is the energy of TS(k) and $E_{bi}$ is the energy of $\tilde{b}_i(k)$. The sum of logarithms is the logarithm of the product and since the logarithm is a monotonic function, the maximum (or minimum) of log (a·b·c) is the maximum (or minimum) of (a·b·c). Therefore, equation (4) reduces to:

$$\psi_{logi}(k)=\psi_{log(i-1)}(k)(E_sE_{bi}-|c_i(k)|^2), \qquad (5)$$

The minimum value of the cost function, as illustrated above in equation (5), $k_{min}$, is the desired TOA in sampling point units. With the detected $k_{min}$, an estimate of the channel impulse response is performed for each burst and interpolated to give the desired resolution.

Figure 1:
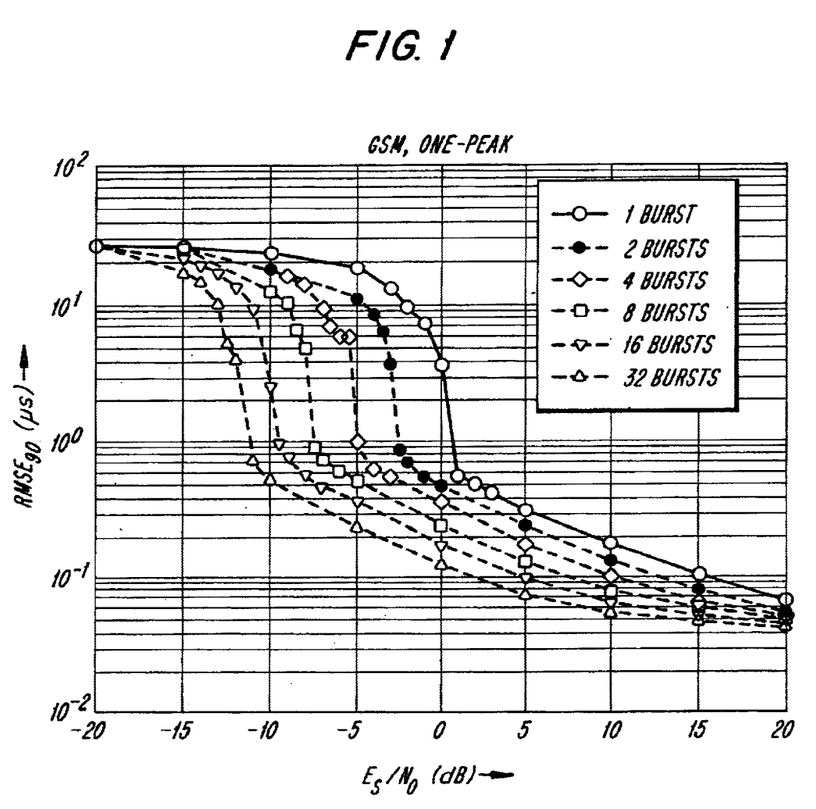
FIG. 1 illustrates the TOA estimation performance for an ICI algorithm in a "one-peak" propagation channel with additive white Gaussian noise.
Figure 2:
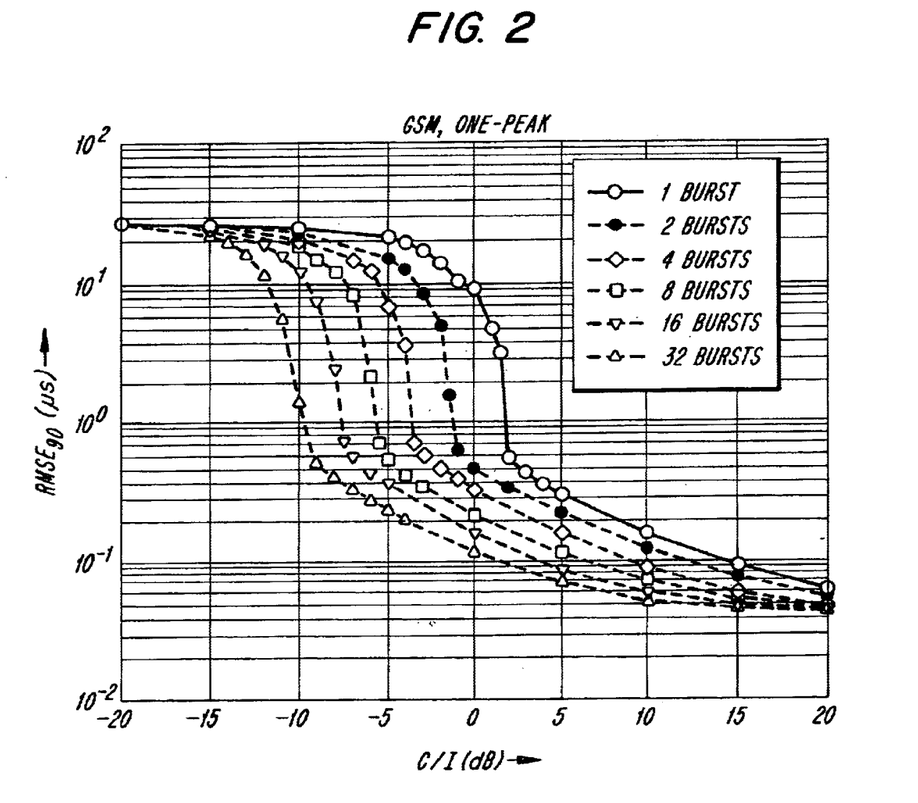
FIG. 2 illustrates the TOA estimation performance for an ICI algorithm in a "one-peak" propagation channel with interference.

FIGS. 1 and 2 respectively illustrate the TOA estimation performance of the ICI algorithm in a static one-peak channel with additive White Gaussian noise (AWGN) and Co-channel interference (CCI). The Figures illustrate the root-mean-square error (RMSE, 90%) in microseconds as function of signal-to-noise ratio $E_S/N_0$ (FIG. 1) and C/I (FIG. 2) for a different number of GSM normal bursts used in the incoherent integration process. The results illustrated in FIGS. 1 and 2 assume that the transmitted bursts are GSM normal bursts and that the receiver assumes that GSM normal bursts have been transmitted.

As illustrated in FIG. 1, the TOA estimation error is characterized by a large scale error region at low SNR dominated by outliers uniformly distributed across the correlation window, a small-scale error region at high SNR, and a transition region in which large outliers may occur, but with low probability. The breakpoint SNR value between the low and high error region can be shifted to lower SNR's by increasing the number of bursts used for the TOA estimation. For example, FIG. 1 illustrates that using one normal burst it is possible to estimate a TOA for $E_S/N_0>1$ dB, for 2 bursts it is possible to estimate a TOA for $E_S/N_0>-2$ dB and for 4 bursts it is possible to estimate a TOA for $E_S/N_0>-5$ dB, etc. Every doubling of the number of bursts results in a performance improvement of approximately 3 dB. By comparing FIGS. 1 and 2, it can be seen that the TOA error estimation for CCI is similar to that described above with respect to AWGN except that the breakpoint is about 1–2 dB worse for CCI.

An evolution of the GSM system will be the introduction of EDGE (Enhanced Data Rates for Global Evolution), also known as GSM++. EDGE makes it possible for existing GSM operators to provide high-speed mobile multimedia communications using the existing Time Division Multiple Access (TDMA) scheme, i.e., 200 kHz carriers with frequency bands of today; 800, 900, 1800 and 1900 MHz.

To achieve a higher data rate using EDGE, the modulation scheme normally used for GSM, i.e., Gaussian Minimum Shift Keying (GMSK) is changed to 8 phase shift key (8PSK) in EDGE. In such a scenario, GSM and EDGE modulated signals will co-exist. This will have an impact on the design and performance of TOA estimation algorithms for E-OTD. An implementation of the E-OTD positioning method must take into account that 8PSK modulated signals may co-exist with GMSK modulated signals. This is not only important for EDGE capable mobile stations, it is also important for GSM only mobiles, which will be used in future networks.

In a future network, GSM and EDGE modulated signals may co-exist. The useful signal the mobile station measures may then be either GMSK or 8PSK modulated. The time slot 0 will probably also in the future contain GMSK modulated bursts only (the synchronization channel, broadcast control channel and other common control channels). However, the time slots 1–7 may contain 8PSK modulated (normal) bursts. The EDGE training sequences have been derived from the binary GSM training sequences. The EDGE modulation format however, has been designed such that mutual orthogonality between GSM and EDGE users is obtained. This will have an impact on the TOA estimation algorithm.

Figure 3A:
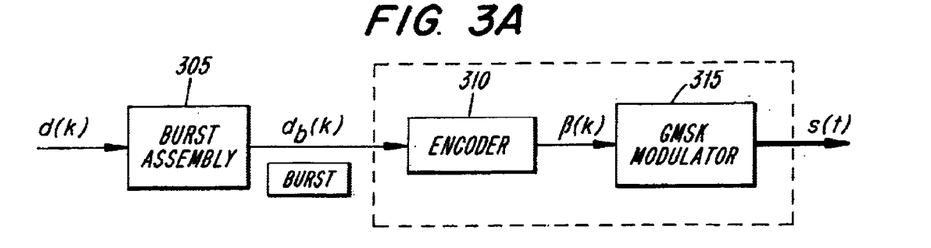
FIG. 3A illustrates a simplified equivalent baseband representation of a GSM transmitter.
Figure 3B:
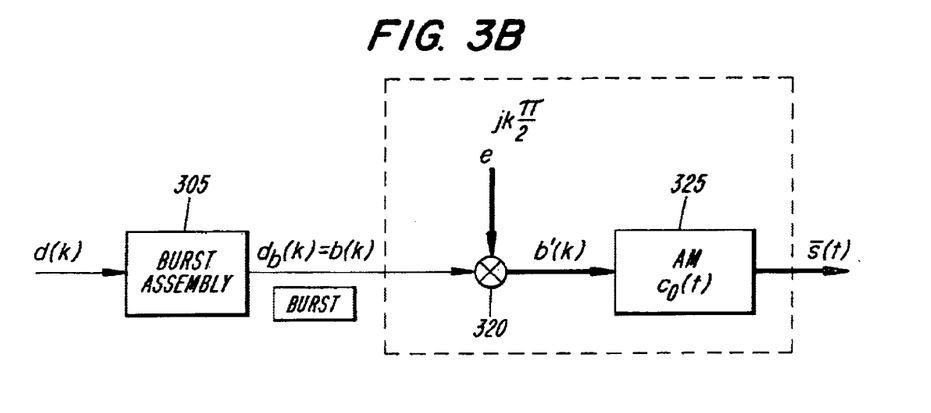
FIG. 3B illustrates a linear approximation of the GSM transmitter shown in FIG. 3A.

FIG. 3A illustrates a simplified equivalent baseband representation of a GSM transmitter, where source and channel coding are omitted to enhance clarity. In the transmitter, coded bits d(k) together with a training sequence are assembled into bursts by Burst Assembly unit 305. The burst data sequence $d_b(k)$ is differentially encoded to facilitate coherent demodulation by encoder 310. The resulting sequence β(k) is then modulated by GMSK with BT=0.3 (i.e., the 3 dB bandwidth B multiplied by the symbol duration T) by GMSK modulator 315 and transmitted over the radio channel. Although, GMSK is a non-linear modulation scheme, it can be approximated by a linear modulation. It can be shown, that a GMSK modulation of a differentially encoded sequence can be approximated by an amplitude modulated signal of a rotated data sequence exp(jkπ/2) b(k). The linear approximation of the GSM transmitter is illustrated in FIG. 3B. As illustrated in FIG. 3B, coded bits d(k) together with a training sequence are assembled into bursts using Burst Assembly unit 305. The burst data sequence $d_b(k)$ is multiplied by exp(jkπ/2) by multiplier 320. The pulse shaping filter $c_0(t)$ 325 is the main component of the Laurent decomposition of the GMSK modulation.

Figure 3C:
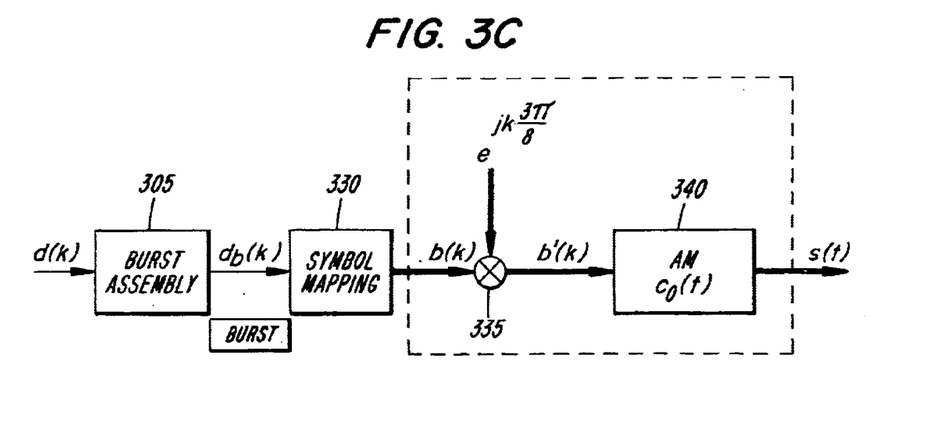
FIG. 3C illustrates a simplified representation of an EDGE transmitter.

FIG. 3C illustrates an exemplary EDGE transmitter. Initially, coded bits d(k) together with training sequences are assembled into bursts using Burst Assembly unit 305. In EDGE, the modulation scheme is the linear 8PSK modulation. Accordingly, three consecutive bits of the burst data $d_b(k)$ are mapped onto one symbol in the I/Q-plane according to a Gray code using Symbol Mapping unit 330. With the same symbol rate as in GSM of 271 ks/s, the bit rate now becomes 813 kb/s. The 8PSK symbols are continuously rotated by 3π/8 radians per symbol using multiplier 335. Amplitude modulator 340 performs pulse shaping on the rotated symbols. The modulating 8PSK symbols can be represented by Dirac pulses exciting a linear pulse-shaping filter. This filter is the linearized GMSK impulse, i.e. the main component in a Laurent decomposition of the GMSK modulation. Therefore, the spectral properties of the GSM and EDGE signals are basically the same, i.e. the EDGE signal will fit into the GSM spectrum mask.

Figure 4A:
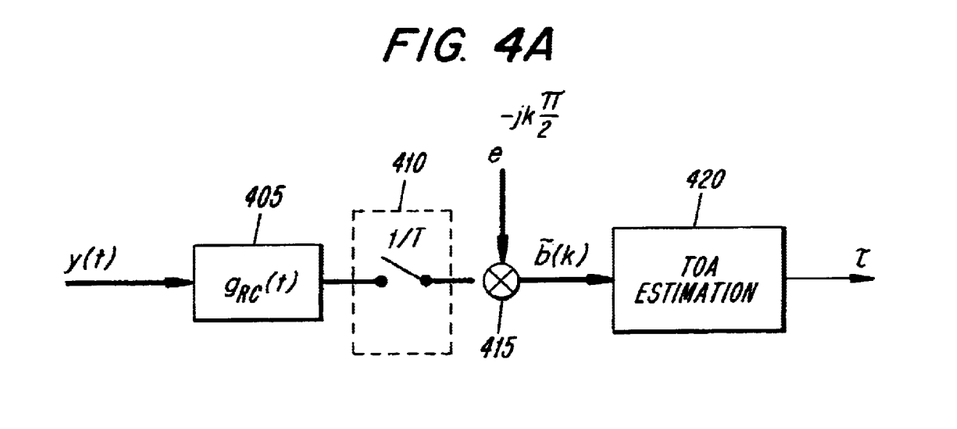
FIGS. 4A and 4B respectively illustrate the demodulation of a received sequence by de-rotation for a GSM receiver and an EDGE receiver.
Figure 4B:
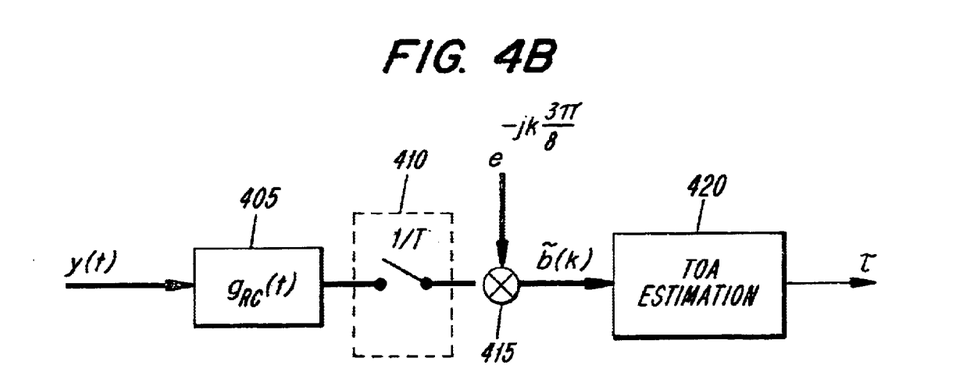

FIGS. 4A and 4B respectively illustrate receivers for GSM and EDGE signals. As illustrated in FIGS. 4A and 4B, the received signal y(t) is filtered using filter $g_{RC}(t)$ 405. The filtered signal is sampled at a symbol rate of 1/T using sampler 410. The demodulation of the received sequence can be performed by a simple de-rotation, as illustrated by the multiplier 415 in FIGS. 4A and 4B. However, the de-rotation for GSM and EDGE signals is different. The different rotation of GSM and EDGE signals results in mutual orthogonal signals. This orthogonality can be used to blindly detect the modulation scheme. To detect the modulation scheme, the receiver would first de-rotate the received sequence with exp(−jkπ/2), i.e., the rotation applied to GSM Signals, and then perform a correlation with the known training sequence. Secondly, the receiver will use the same received sequence and perform a de-rotation with exp(−jk3π/8), i.e., the rotation applied to EDGE signals, and perform the correlation with the known training sequence again.

Based on these two correlation results, the receiver can decide if the received signal was an EDGE or GSM signal. This detection of the modulation scheme works for signal-to-noise ratios down to 3–5 dB with a sufficiently high probability. For E-OTD location however, the mobile station must measure the TOA of distant base stations, which, as described above, results in very low signal-to-noise ratios, typically down to −10 dB. Therefore, in an environment where EDGE and GSM signals co-exist, TOA estimation algorithms are desired, which do not require modulation scheme detection. Further, TOA estimation algorithms which operate at low signal-to-noise ratios are desired.

SUMMARY OF THE INVENTION

It is an object of the present invention to provide a new, less complex, yet efficient method for performing TOA measurements on an arbitrary combination of GSM and EDGE bursts without requiring the detection of the modulation scheme.

It is also an object of the present invention to implement such a method without requiring new mobile station hardware.

It is further an object of the present invention to provide such a method where the measurements can be made at very low signal-to-noise ratios, and nevertheless ensure a high availability of location services.

It is still another object of the present invention to provide such a method that enables E-OTD measurements to be reported with minimal delay, which is particularly important for a dedicated mode of operation.

In accordance with the present invention, a received signal is initially demodulated by a receiver in accordance with a first demodulation scheme. The demodulated signal is split into two copies. Taking into account the initial demodulation, one of the copies is demodulated in accordance with another demodulation scheme, thereby resulting in a first signal demodulated in accordance with the first demodulation scheme and a second signal demodulated in accordance with a second demodulation scheme. A training sequence is used to correlate the two signals. The correlation results are then summed in a incoherent integration process. The result of the incoherent integration is used to estimate the time of arrival of the received signal.

BRIEF DESCRIPTION OF THE DRAWINGS

These and other objects, features and advantages of the present invention will be readily apparent to one skilled in the art from the following written description, read in conjunction with the drawings, in which.

DETAILED DESCRIPTION OF THE INVENTION

The various features of the invention will now be described with reference to the figures, in which like parts are identified with the same reference characters.

In the following description, for purposes of explanation and not limitation, specific details are set forth in order to provide a thorough understanding of the present invention. However, it will be apparent to one skilled in the art that the present invention may be practices in other embodiments that depart from these specific details. In other instances, detailed descriptions of well known methods, devices, and circuits are omitted so as not to obscure the description of the present invention.

Prior to discussing exemplary embodiments of the present invention in detail, a brief description of the application of the ICI algorithm in connection with a GSM receiver which receives both GSM modulated and EDGE modulated signals is presented below in connection with FIGS. 5–7 to highlight some of the principals upon which the present invention is based. Specifically, the discussion below in connection with FIGS. 5–7 illustrate the general applicability, as well as the limitations, of the ICI algorithm when the modulation of the received signal is unknown.

Figure 5:
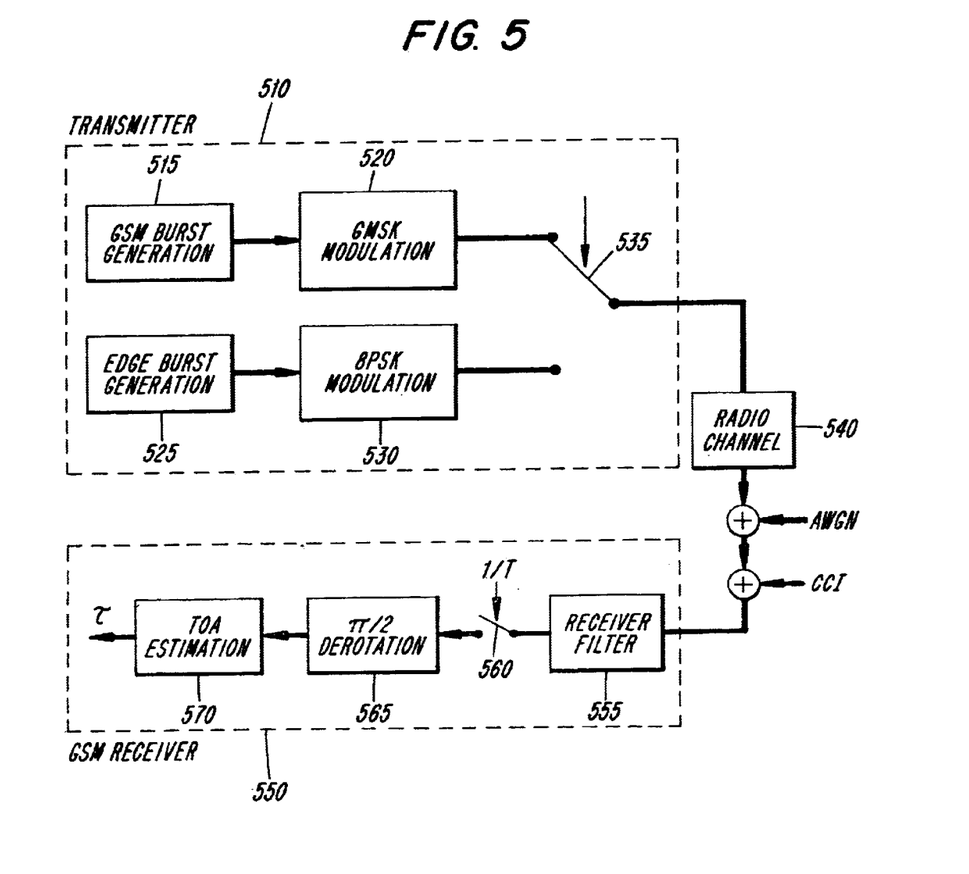
FIG. 5 illustrates a transmitter that generates GSM and EDGE modulated signals and a GSM receiver.

FIG. 5 illustrates an exemplary transmitter that generates GSM and EDGE modulated signals and a GSM receiver in accordance with the present invention. The transmitter 510 includes GSM Burst Generation 515, GMSK Modulation 520, Switch 535, EDGE Burst Generation 525, and 8PSK Modulation 530. The GSM receiver 550 includes receive filter 555, sampler 560, Derotation unit 565 and TOA Estimation 570. Assume that the signal which is transmitted over the radio channel is selected randomly to obtain a uniform distribution of GSM and EDGE transmitted signals. As illustrated by the addition blocks in FIG. 5, the radio channel may subject the transmitted signal to either or both AWGN and CCI. The receiver filter 555 can be a 4-th order Butterworth receiver filter with cut-off frequency of 93 kHz. The filtered signal is sampled at symbol rate by sampler 560 and de-rotated by $\pi/2$ radians by Derotation unit 565. The so obtained received sequence is used for the ICI TOA estimation algorithm. Assume that the interference signal (i.e., either AWGN or CCI) is generated in the same way as the useful signal, i.e. GSM and EDGE modulated interfering signals are randomly generated with same probability.

Figure 6:
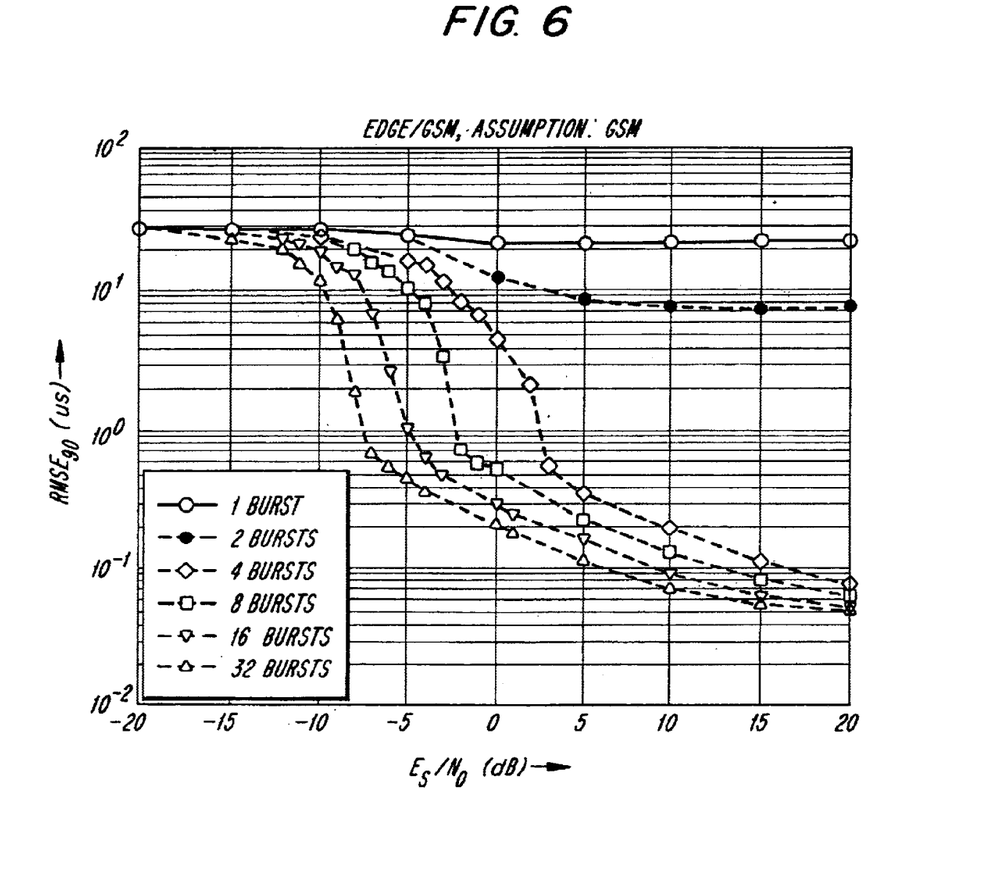
FIG. 6 illustrates the TOA estimation performance in a "one-peak" propagation channel for different number of normal bursts with additive white Gaussian noise, where EDGE and GSM bursts are transmitted with the same probability.
Figure 7:
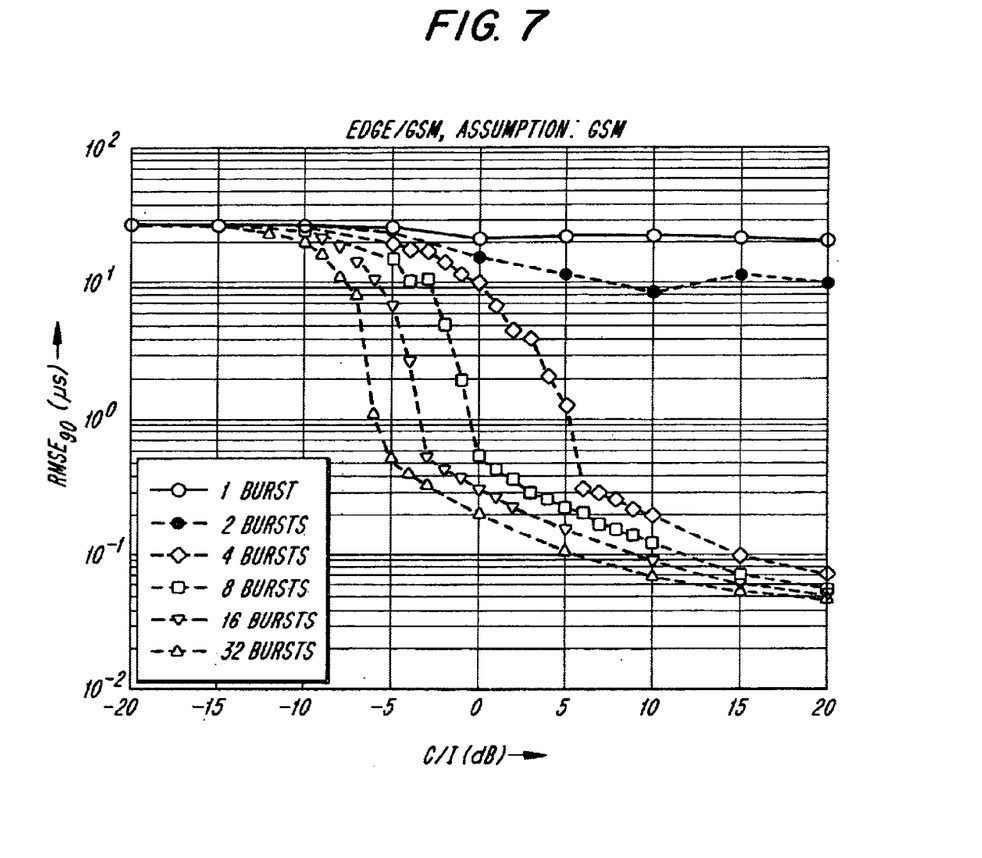
FIG. 7 illustrates TOA estimation performance in a "one-peak" propagation channel for different number of normal bursts with interference, where EDGE and GSM bursts are transmitted with the same probability.

FIG. 6 illustrates TOA estimation performance in a "one-peak" propagation channel for different number of (normal) bursts with additive white Gaussian noise, where EDGE and GSM bursts are transmitted with the same probability. FIG. 7 illustrates TOA estimation performance in a "one-peak" propagation channel for different number of normal bursts with interference, where EDGE and GSM bursts are transmitted with the same probability. If only one burst is used for TOA estimation and no information about the modulation is available at the receiver, then the performance of the TOA estimation algorithm is completely random.

The same is true for the 2 bursts case, however, the probability that at least one of the two bursts consists of a GSM burst is now higher. The more bursts used for TOA estimation, the higher is the probability, in this example, that GSM modulated bursts are in the received sequence and the better is the TOA estimation performance. If more than 8 bursts are used for TOA estimation the performance is acceptable. For example, using 8 bursts a TOA estimate is possible for $E_S/N_0>-2$ dB.

If all bursts have the same modulation, then in the 8 burst case a TOA estimate is possible for $E_S/N_0>-8$ dB, as can be seen from FIG. 1, i.e. there is a loss of 6 dB. The loss reduces with increased number of bursts, and for 32 bursts the loss is 4 dB. In principle, if the number of bursts used are large (i.e., much greater than 32) the loss in performance will be 3 dB, since only half of the used bursts in this example will have the assumed modulation format (i.e. ~GMSK).

Therefore, the ICI algorithm can in principle also be used if the modulation of the received signal is unknown. The algorithm uses the available bursts and if at least a few bursts have the assumed modulation (GMSK in this example), a TOA estimate is possible. The probability that at least a few bursts have the assumed modulation format increases with increased number of bursts used for TOA estimation. The correlation results for the EDGE bursts contribute to the ICI sum like noise.

Accordingly, the basic ICI algorithm can in principle be applied directly on mixed GMSK/EDGE bursts, with some performance degradation. This performance degradation is especially notable when only a few bursts are used for integration. A more serious drawback is that the above-described method requires that at least a few bursts of the assumed modulation type is present in the received signal. In reality, it may happen that one operator allocates the complete BCCH to GMSK, which would make the EDGE tuned TOA receiver useless. Other operators may choose to have all EDGE traffic on the BCCH frequency, which deteriorates the performance of the GMSK adapted TOA receiver i.e., GSM receiver. Therefore it is necessary to develop a method which does not suffer from the above mentioned problems.

In order to avoid the above mentioned problems, the present invention provides a modified ICI algorithm which makes more efficient use of the possible modulation types that may be present in the received signals.

Figure 8:
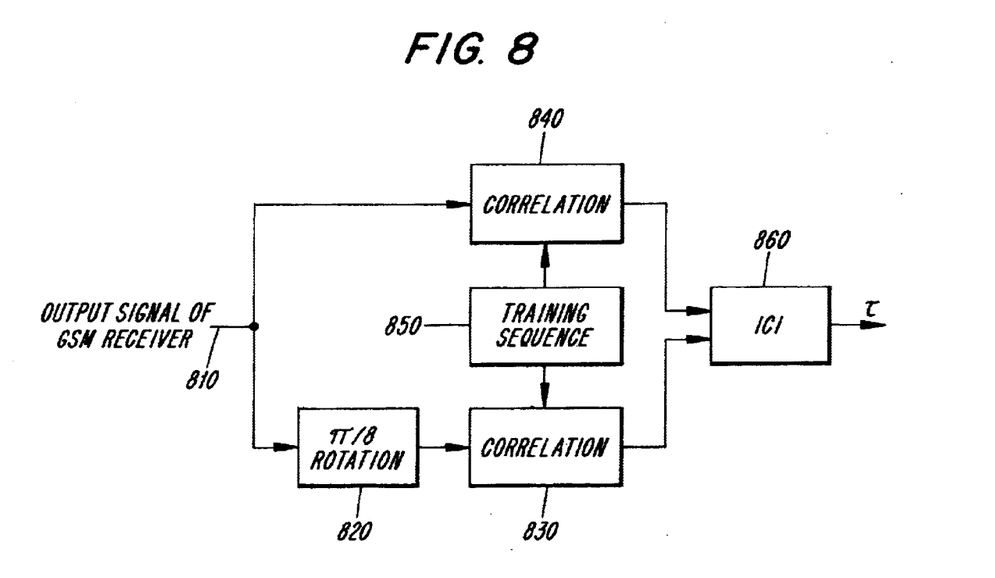
FIG. 8 is a block diagram of an apparatus which performs the modified ICI algorithm in accordance with exemplary embodiments of the present invention.

FIG. 8 illustrates an exemplary apparatus for implementing a modified version of the above-described ICI algorithm. The apparatus includes an input 810, an Rotator unit 820, correlators 830 and 840, training sequence generator 850 and ICI block 860. The output of a GSM receiver, i.e., a signal demodulated in accordance with GMSK demodulation, is sent to input 810. The input signal is split along two paths. In one path the input signal is rotated by $\pi/8$ by Rotator unit 820 and then passed to correlator 830. The apparatus illustrated in FIG. 8 assumes that it is receiving a GSM signal, i.e., a signal which has been GMSK demodulated by a GSM receiver. Accordingly, the $\pi/8$ radian rotation removes the EDGE modulation of the received signal. The $\pi/8$ rotation results from a rotation of the received signal by $\pi/2$ by the GSM receiver to remove the GMSK rotation and then a de-rotation by $3\pi/8$ per symbol to remove the rotation used for EDGE signal, i.e., $\pi/2 - 3\pi/8$.

The input signal is then correlated in correlators 830 and 840 using a training sequence generated by training sequence generator 850. The correlated signals are passed from correlators 830 and 840 to ICI block 860. The two correlations are summed during the processing in ICI block 860. The summation performed in ICI block 860 can be selected from any of the equations 2–5 presented above. For example, if it is desired to weight the summation based upon an estimated SNR then equation 3 can be used. Alternatively, in view of the difficulty associated with estimating the weights used in equation 3, the algorithm described in equations 4 and 5 can be used for the ICI process.

Figure 9:
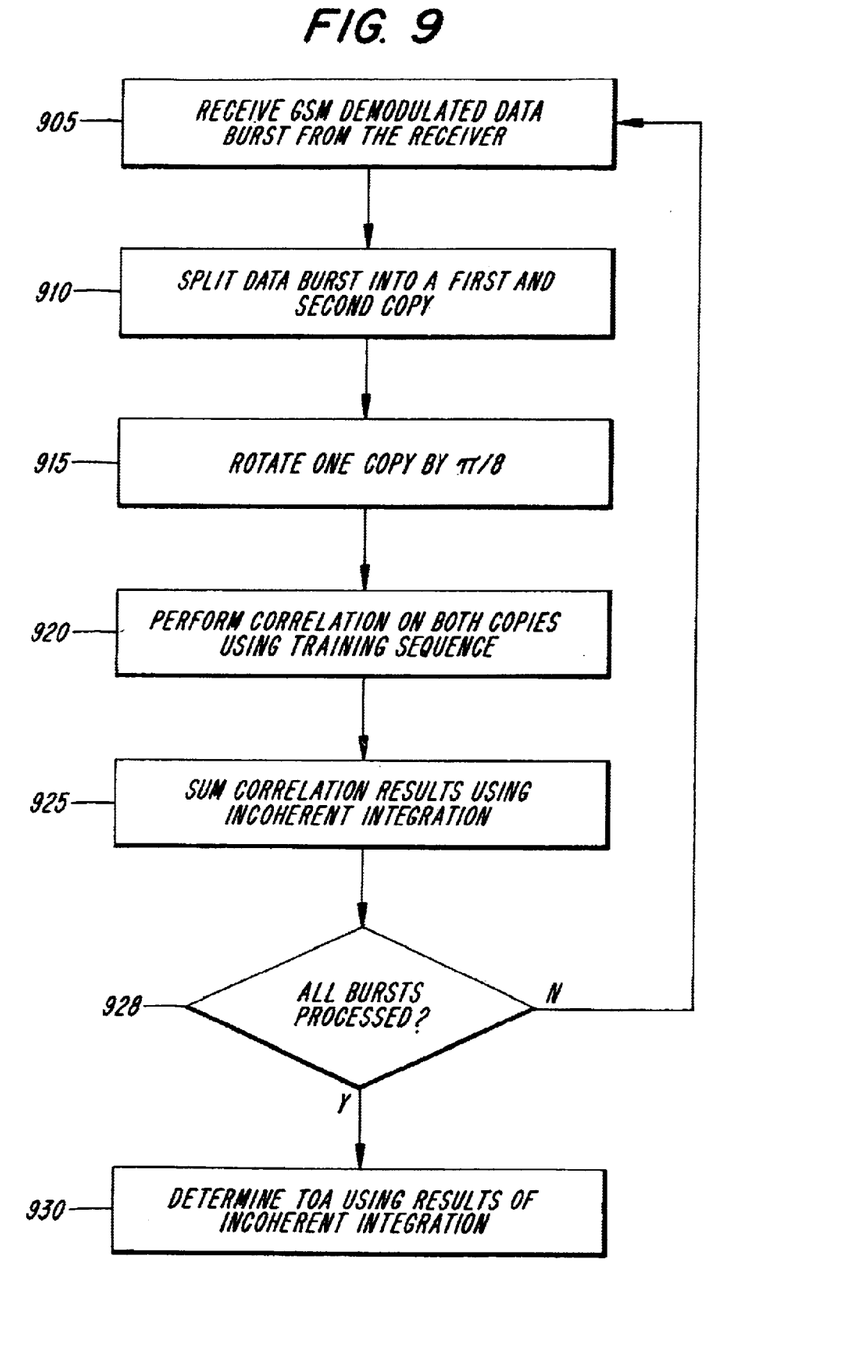
FIG. 9 illustrates an exemplary method of implementing the modified ICI algorithm in accordance with the present invention.

FIG. 9 illustrates an exemplary method for using the modified ICI algorithm to determine TOA in accordance with the present invention. Initially a demodulated data burst is received from the receiver (Step 905). The data burst is demodulated by the GSM receiver by $\pi/2$ because the GSM receiver assumes that it is receiving GSM data bursts. The received data burst is split into a first and second copy (Step 910) and one copy is rotated by $\pi/8$ (Step 915). A correlation is performed using the training sequence on one copy and the rotated copy of the signal (Step 920). The results of the correlation are summed using the ICI algorithm in accordance with one of the equations 2–5 described above (Step 925). Next it is determined if all bursts have been processed (step 928). If not all bursts have been processed ("No" path out of decision Step 928), then the next burst is received from the receiver (Step 905). If all bursts have been processed ("Yes" path out of decision Step 928) then the TOA is determined using the results of the ICI (Step 930).

Figure 10:
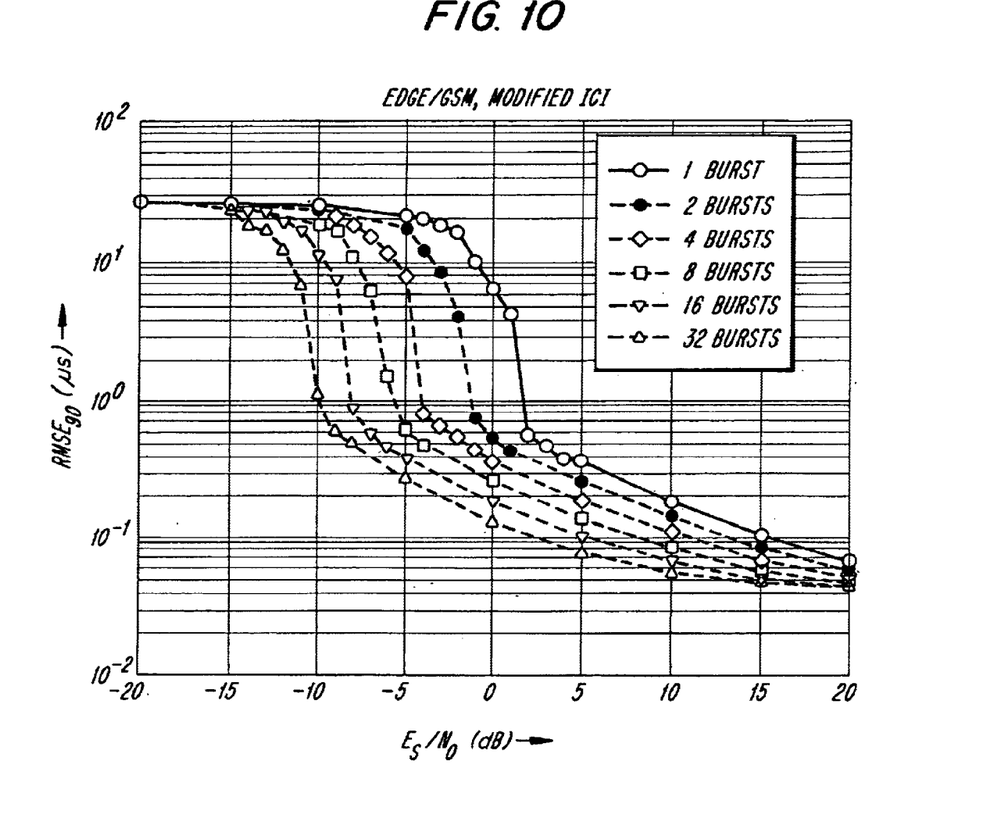
FIG. 10 illustrates the TOA estimation performance associated with the modified ICI algorithm, in a "one-peak" propagation channel for different number of normal bursts with additive white Gaussian noise, where EDGE and GSM bursts are transmitted with the same probability.
Figure 11:
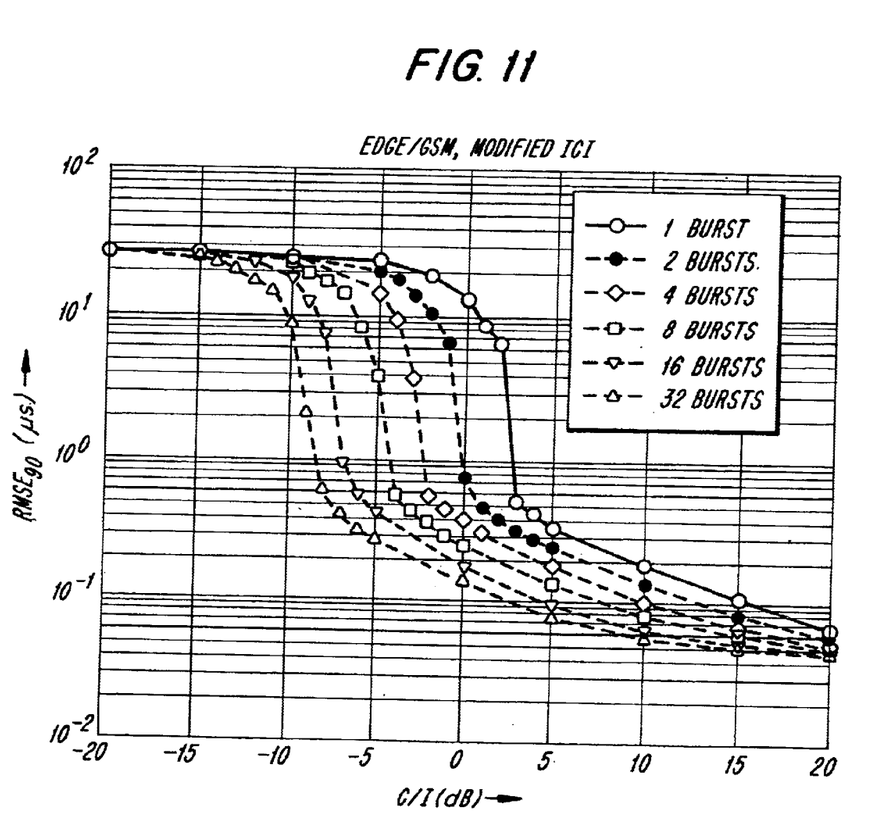
FIG. 11 illustrates the TOA estimation performance associated with the modified ICI algorithm, in a "one-peak" propagation channel for different number of normal bursts with interference, where EDGE and GSM bursts are transmitted with the same probability.

FIGS. 10 and 11 respectively illustrate the TOA performance using the apparatus illustrated in FIG. 8 for a channel which experiences AWGN and CCI. By comparing FIGS. 10 and 11 with FIGS. 6 and 7, the improvement using the modified ICI algorithm in accordance with the present invention can be seen. In fact, by comparing the FIGS. 10 and 11 with FIGS. 1 and 2, it can be seen that the modified version of the ICI algorithm in accordance with the present invention in an environment where GSM and EDGE signals co-exist results in almost the same performance as in the GSM or EDGE only case, where a loss of about 1 dB only can be observed. It should be noted that no detection of the modulation format is necessary.

Although the present invention has been described above in connection with a GSM receiver, the present invention is equally applicable to a EDGE receiver. In case of an EDGE receiver, rotator unit 820 would perform a derotation of $-\pi/8$. The remainder of the processing would be performed in accordance with the description above.

It should be noted that exemplary methods of the present invention are not limited to application described above. The present invention has been described in terms of specific embodiments to facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being fully commensurate in scope with the following claims.

What is claimed is:

1. In a mobile telecommunications network wherein each burst of data is modulated in accordance with one of a first or a second modulation scheme, a method for estimating time of arrival comprising the steps of:

receiving a plurality of data bursts;

generating, from the plurality of received data bursts, a first sequence of demodulated data bursts based on the first modulation scheme;

generating, from the first sequence of demodulated data bursts, a second sequence of demodulated data bursts based on the second modulation scheme;

correlating each data burst associated with the first sequence of demodulated data bursts and each data burst associated with the second sequence of demodulated data bursts with a training sequence; and incoherently integrating the correlation results to estimate said time of arrival.

2. The method of claim 1, wherein said step of generating, from the plurality of received data bursts, the first sequence of demodulated data bursts based on the first modulation scheme comprises the step of:

rotating each of the received plurality of data bursts by an angular amount that corresponds with the first modulation scheme.

3. The method of claim 1, wherein said step of generating, from the first sequence of demodulated data bursts, the second sequence of demodulated data bursts based on the second modulation scheme comprises the step of:

rotating each data burst associated with the first sequence of demodulated data bursts by an angular amount that corresponds with the second modulation scheme.

4. The method of claim 1, wherein said step of incoherently integrating the correlation results to estimate said time of arrival comprises the step of:

applying a weighting factor to each correlation result, wherein the weighting factor that is applied to any one correlation result is based on a corresponding signal-to-noise ratio.

5. The method of claim 1, wherein said step of incoherently integrating the correlation results to estimate said time of arrival comprises the step of:

applying a maximum likelihood criterion.

6. In a Global System for mobile telecommunications (GSM) based network that employs Enhanced Data Rates for Global Evolution (EDGE), a method for estimating time of arrival comprising the steps of:

receiving a plurality of data bursts;

demodulating each of the plurality of data bursts based on a Gaussian Minimum Shift Keying (GMSK) modulation scheme, thereby producing a first sequence of demodulated data bursts;

demodulating each data burst associated with the first sequence of demodulated data bursts based on a Phase Shift Keyed (PSK) modulation scheme, thereby producing a second sequence of demodulated data bursts;

correlating each data burst associated with the first sequence of demodulated data bursts and each data burst associated with the second sequence of demodulated data bursts with a training sequence; and incoherently integrating the correlation results to estimate said time of arrival.

7. The method of claim 6, wherein said step of demodulating each of the plurality of data bursts based on a GMSK modulation scheme comprises the step of:

derotating each of the plurality of data bursts by an angular amount that corresponds with the GMSK modulation scheme.

8. The method of claim 7, wherein said step of derotating each of the plurality of data bursts by an angular amount comprises the step of:

derotating each of the plurality of data bursts by an amount equal to $\pi/2$.

9. The method of claim 6, wherein said step of demodulating each data burst associated with the first sequence of demodulated data bursts based on a PSK modulation scheme comprises the step of:

rotating each data burst associated with the first sequence of demodulated data bursts by an angular amount that corresponds with the PSK modulation scheme.

10. The method of claim 9, wherein said step of rotating each data burst associated with the first sequence of demodulated data bursts by an angular amount comprises the step of:

rotating each data burst associated with the first sequence of demodulated data bursts by an amount equal to $\pi/8$.

11. The method of claim 6, wherein the PSK modulation scheme is an 8-PSK modulation scheme.

12. The method of claim 6, wherein said step of incoherently integrating the correlation results to estimate said time of arrival comprises the steps of:

mathematically squaring each correlation result; and summing the square of each correlation result.

13. The method of claim 12, wherein said step of incoherently integrating the correlation results to estimate said time of arrival further comprises the step of:

applying a weighting factor to the square of each correlation result, wherein the weighting factor that is applied to the square of any one correlation result is based on a corresponding signal-to-noise ratio.

14. The method of claim 12, wherein said step of incoherently integrating the correlation results to estimate said time of arrival further comprises the step of:

applying a maximum likelihood criterion.

15. In a mobile station comprising:

means for receiving a plurality of data bursts;

means for generating, from the plurality of received data bursts, a first sequence of demodulated data bursts based on a first modulation scheme;

means for generating, from the first sequence of demodulated data bursts, a second sequence of demodulated data bursts based on a second modulation scheme;

means for correlating each data burst associated with the first sequence of demodulated data bursts and each data burst associated with the second sequence of demodulated data bursts with a training sequence; and means for incoherently integrating the correlation results to estimate said time of arrival.

16. The mobile station of claim 15, wherein said means for generating, from the plurality of received data bursts, the first sequence of demodulated data bursts based on the first modulation scheme comprises:

means for rotating each of the received plurality of data bursts by an angular amount that corresponds with the first modulation scheme.

17. The mobile station of claim 15, wherein said means for generating, from the first sequence of demodulated data bursts, the second sequence of demodulated data bursts based on the second modulation scheme comprises:

means for rotating each data burst associated with the first sequence of demodulated data bursts by an angular amount that corresponds with the second modulation scheme.

18. The mobile station of claim 15, wherein said means for incoherently integrating the correlation results to estimate said time of arrival comprises:

means for applying a weighting factor to each correlation result, wherein the weighting factor that is applied to any one correlation result is based on a corresponding signal-to-noise ratio.

19. The mobile station of claim 15, wherein said means for incoherently integrating the correlation results to estimate said time of arrival comprises:

means for applying a maximum likelihood criterion.

* * * * *